United States Patent [19]
Randazzo et al.

[11] Patent Number: 5,792,294
[45] Date of Patent: Aug. 11, 1998

[54] METHOD OF REPLACING SHEAVE LINER

[75] Inventors: John Randazzo, Torrington, Conn.;
John D. Barrett, Brooklyn, N.Y.;
Christopher J. Elliott, Manchester;
David W. McKee, Somers, both of
Conn.; Hugh J. O'Donnell,
Longmeadow, Mass.; John P. Wesson,
Vernon; Blair J. Cohen, Manchester,
both of Conn.

[73] Assignee: Otis Elevator Company, Farmington, Conn.

[21] Appl. No.: 559,357

[22] Filed: Nov. 16, 1995

[51] Int. Cl.⁶ .................................................. B29C 73/00
[52] U.S. Cl. .................... 156/94; 29/402.08; 156/91;
156/158; 156/304.2; 156/331.7; 187/254;
254/371; 254/390; 254/393; 474/168; 474/178;
474/254; 474/256
[58] Field of Search ................................ 156/91, 94, 98,
156/158, 159, 281, 304.1, 304.2, 304.3,
304.5, 304.6, 331.7; 187/254; 226/190;
242/615.4; 254/390, 902, 371, 373; 474/168,
178, 191, 253, 254, 255, 256; 198/844.2;
29/892.1, 402.08

[56] References Cited

U.S. PATENT DOCUMENTS

| | | | |
|---|---|---|---|
| 125,228 | 4/1872 | Sutton | 474/191 |
| 2,038,469 | 4/1936 | Bannister | 474/256 |
| 2,533,456 | 12/1950 | Harrison | 474/191 |
| 2,806,380 | 9/1957 | Martin | 474/178 |
| 3,245,276 | 4/1966 | Wall | 474/256 |
| 3,248,775 | 5/1966 | Morrow | 474/191 |
| 3,279,762 | 10/1966 | Bruns | 187/254 |
| 3,934,482 | 1/1976 | Byers | 254/371 |
| 4,030,569 | 6/1977 | Berkovitz | 254/390 |
| 4,240,852 | 12/1980 | Gomberg et al. | 156/315 |
| 4,287,651 | 9/1981 | Cilderman et al. | 29/892.1 |
| 4,441,692 | 4/1984 | Kovaleski | 254/902 |
| 5,112,933 | 5/1992 | O'Donnell et al. | 474/168 |

FOREIGN PATENT DOCUMENTS

| | | | |
|---|---|---|---|
| 158427 | 1/1953 | Australia | 198/844.2 |
| 1625813 | 2/1991 | U.S.S.R. | 187/254 |
| 703751 | 2/1954 | United Kingdom | 474/255 |
| 760903 | 11/1956 | United Kingdom | 474/178 |

*Primary Examiner*—Steven D. Maki

[57] ABSTRACT

A sheave liner for an elevator system sheave that supports a hoist rope with an elevator car suspended therefrom is replaced without having to remove the hoist ropes and without having to hang the elevator car by means other than the hoist ropes. The existing liner is cut and removed while the elevator car is suspended from the hoist ropes resting on the sheave. The new liner is rotated into its position and two ends of the liner are joined by either a mechanical bond or by a room temperature adhesive bond.

13 Claims, 3 Drawing Sheets

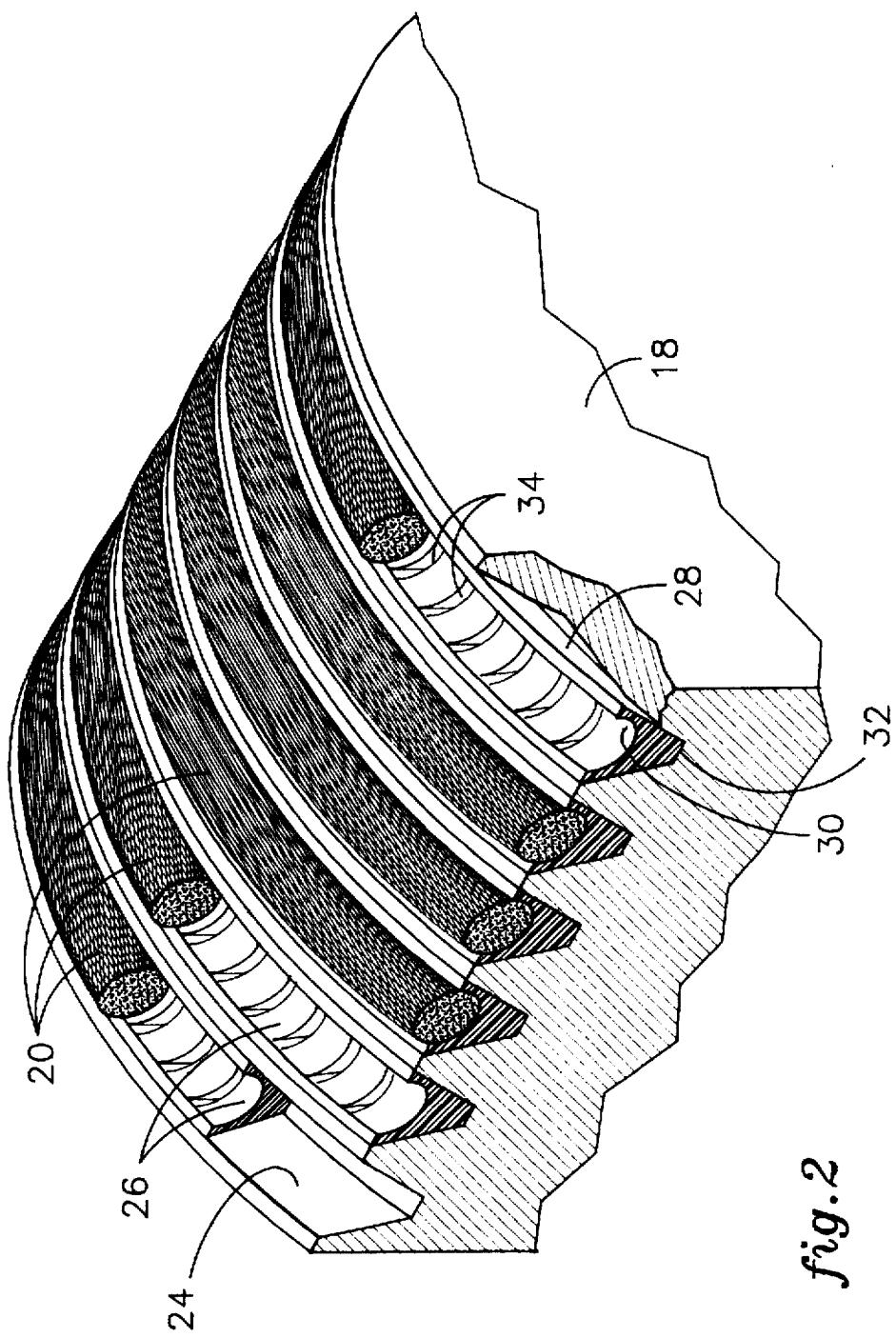

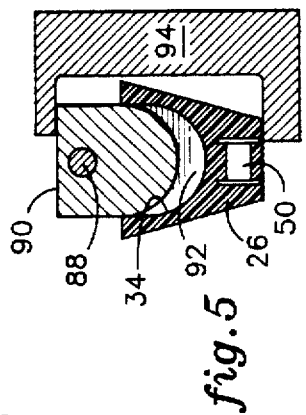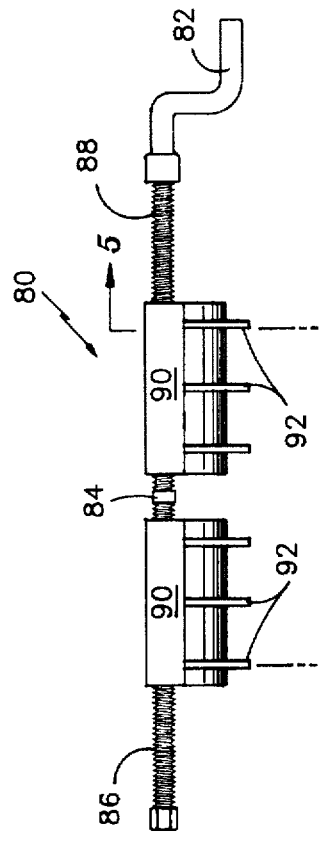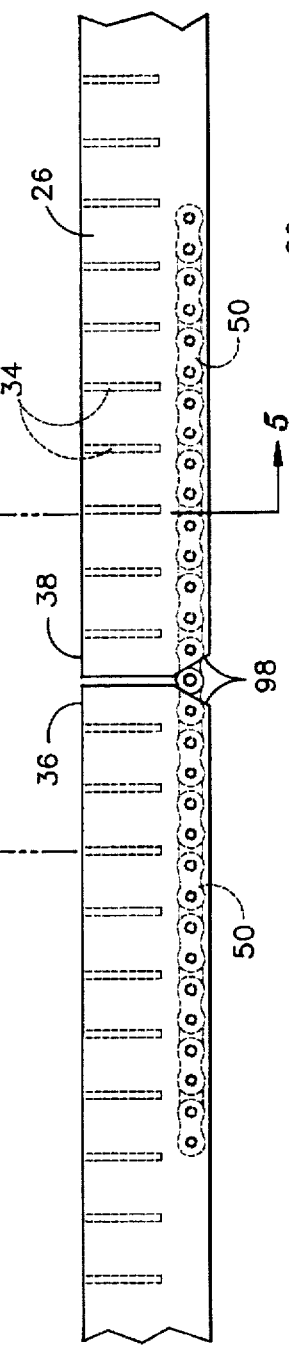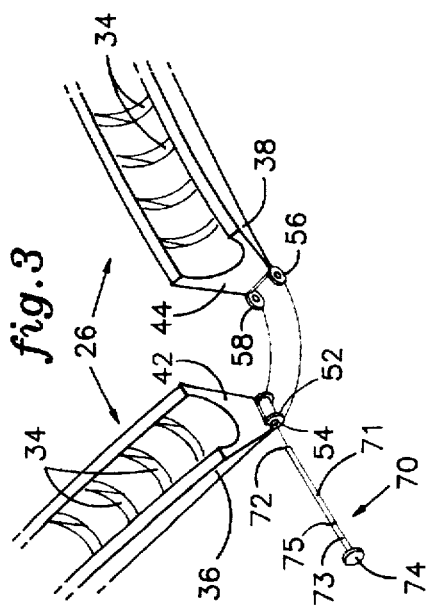

METHOD OF REPLACING SHEAVE LINER

TECHNICAL FIELD

This invention relates to sheave liners for elevators and, more particularly, to replacement thereof.

BACKGROUND ART

A conventional elevator system comprises an elevator car and a counterweight, each suspended on opposite ends of a hoist rope in an elevator hoistway. Modem elevator systems typically include a plurality of hoist ropes supporting each elevator car. The hoist ropes are guided by a grooved pulley or sheave with each hoist rope resting within a sheave groove. The sheave is attached to a drive motor that transmits rotational output to the sheave, thereby moving the elevator car and the counterweight. The sheave and the motor are located in a machine room that is usually disposed above the elevator hoistway.

Sheave liners are typically placed within the sheave groove to provide lining between the hoist rope and the sheave to maximize traction between the hoist rope (actually a steel cable) and the metal sheave as well as to reduce the wear between the two metal parts during the operation of the elevator system. Improved traction allows use of smaller, less expensive drive motors which translates into significant cost savings. Additional cost savings are derived from the increased service life of the hoist rope and the sheave. One drawback associated with the sheave liners is that the liners must be periodically replaced.

Although the replacement of sheave liners is much less costly than the replacement of the hoist rope and the sheave, the replacement procedure for sheave liners is time consuming and removes the elevator from service. The current practice requires a specialized repair crew of two people to spend as much as three days to replace sheave liners on one elevator system. Typically, the repair crew has to "hang" the elevator car (or suspend it by other means, than the hoist ropes). Releasing tension from the ropes allows the crew to remove the hoist ropes from the sheave groove and hence free the sheave liner for replacement. The old liner is then cut and removed. Frequently, the new liner cannot be put onto the sheave as one piece because the sheave is fixedly attached onto the machine room floor with the bearing stand on one side and the drive motor on the other side, thus preventing the liner to be pulled over the sheave. Therefore, the new liners are placed around the sheave with two loose ends that need to be joined together. One constraint affecting the attachment procedure of the two liner ends is that the working space around the drive motor and the sheave is very limited. Another major consideration during the attachment procedure is the integrity of the resulting seam in the liner. The liner must be substantially continuous so that the seam does not interfere with the rotation of the hoist rope. Additionally, the resulting seam between the two ends of the liner must be sufficiently strong to withstand the harsh environment of the machine room.

The existing method of joining the two ends of the liner includes use of a heater that cures an adhesive applied to each end of the liner. The existing process for curing the adhesive has a number of limitations. First, each curing process takes a few hours. Second, the existing heaters can cure only four liners at a time, while some elevators have as many as ten liners. The space limitations around the drive motor and the sheave allow use of only one heater at a time. Third, the curing procedure may have to be repeated more than once for each liner because the heaters are extremely sensitive to changes in the temperature. Frequently, if the temperature is too hot or the heater was on too long, the resulting bond becomes too brittle. Conversely, if the temperature was not sufficiently high or the heater was not on for sufficient amount of time, the bond is not properly cured. Subsequent to the bonding of the liners, the ropes must be placed onto the liners, the elevator car has to be properly aligned and the tension in the ropes must be equalized.

The customers tend to be dissatisfied with the existing replacement process because this procedure requires approximately six (6) person days to be completed and removes the elevator from service for at least several days. Additionally, replacement of sheave liners is not considered to be a regular maintenance task due to its complexity and has to be completed by a repair crew, rather than a maintenance crew. Typically, a maintenance crew is co-located within a large high-rise building, and hence, does not require additional cost and time, while the repair crew has to be requested and paid for additionally. Thus, it is desirable to have an improved procedure for replacement of sheave liners.

DISCLOSURE OF INVENTION

It is an object of the present invention to improve the overall procedure for replacement of sheave liners in elevator systems.

It is another object of the present invention to reduce time required to replace sheave liners.

It is a further object of the present invention to reduce complexity of the sheave liner replacement procedure so that it can be performed by a maintenance crew.

According to the present invention, a sheave liner for an elevator system sheave that supports a hoist rope with an elevator car suspended therefrom is replaced without having to remove the hoist ropes and without having to hang the elevator car by means other than the hoist ropes. The replacement of the sheave liner procedure includes a step of removing the existing sheave liner, a step of rotating the new sheave liner into the proper position within a sheave groove, and a step of joining a first new liner end and a second new liner end while the elevator car is suspended from the hoist ropes that are supported by the new liner.

According to one embodiment of the present invention, a sheave liner includes a first end and a second end with each end having a linking means protruding therefrom to form a mechanical bond. The linking means joining the two liner ends are molded into each end of the polyurethane sheave liner to result in a strong seam. The two ends of the sheave liner can be attached to each other within minutes.

According to another embodiment of the present invention, the two liner ends are joined by means of a room temperature urethane structural adhesive that is applied onto each end of the liner and allowed to cure for approximately two to three (2–3) hours. Since the adhesive cures at room temperature, no bulky heating equipment is necessary and all the sheave liners can be cured simultaneously rather that a few liners at a time.

One primary advantage of the present invention is that the replacement of the sheave liner procedure is significantly shortened as compared to the current practice. The person days required to replace liners in one elevator system is reduced by a factor of at least two (2) and as much as three(3), from approximately six (6) person days to approximately two (2) person days. The time savings result partially from the fact that the elevator car no longer has to be "hung" (or removed) from the drive sheave for the liner to be replaced. Also, the time is saved because the liner ends can be joined faster by means of either a mechanical bond or room temperature urethane adhesive bond and the attachment procedure of these liner ends can be performed simultaneously rather than curing a few liners at a time.

Another major advantage of the present invention is that the procedure of the present invention is substantially simplified and can be completed by a regular maintenance crew rather than by a specialized repair crew.

These and other objects and advantages of the present invention will become more apparent in light of the following detailed description of a best mode embodiment thereof as illustrated in the accompanying drawings.

BRIEF DESCRIPTION OF DRAWINGS

FIG. 2 is an enlarged, broken-away perspective view of the drive sheave lined with a plurality of sheave liners and supporting the hoist ropes of FIG. 1;

FIG. 3 is an exploded perspective view of two ends of the sheave liner of FIG. 2, according to one embodiment of the present invention;

FIG. 4 is an exploded, front view of the two ends of the sheave liner of FIG. 3 fastened together and of a tool used to pull and maintain the two sheave liner ends in close proximity to each other; and FIG. 5 is a side view of the sheave liner attached onto the tool of FIG. 4 by means of a bracket taken along line 5-5.

BEST MODE FOR CARRYING OUT THE INVENTION

Figure 1:
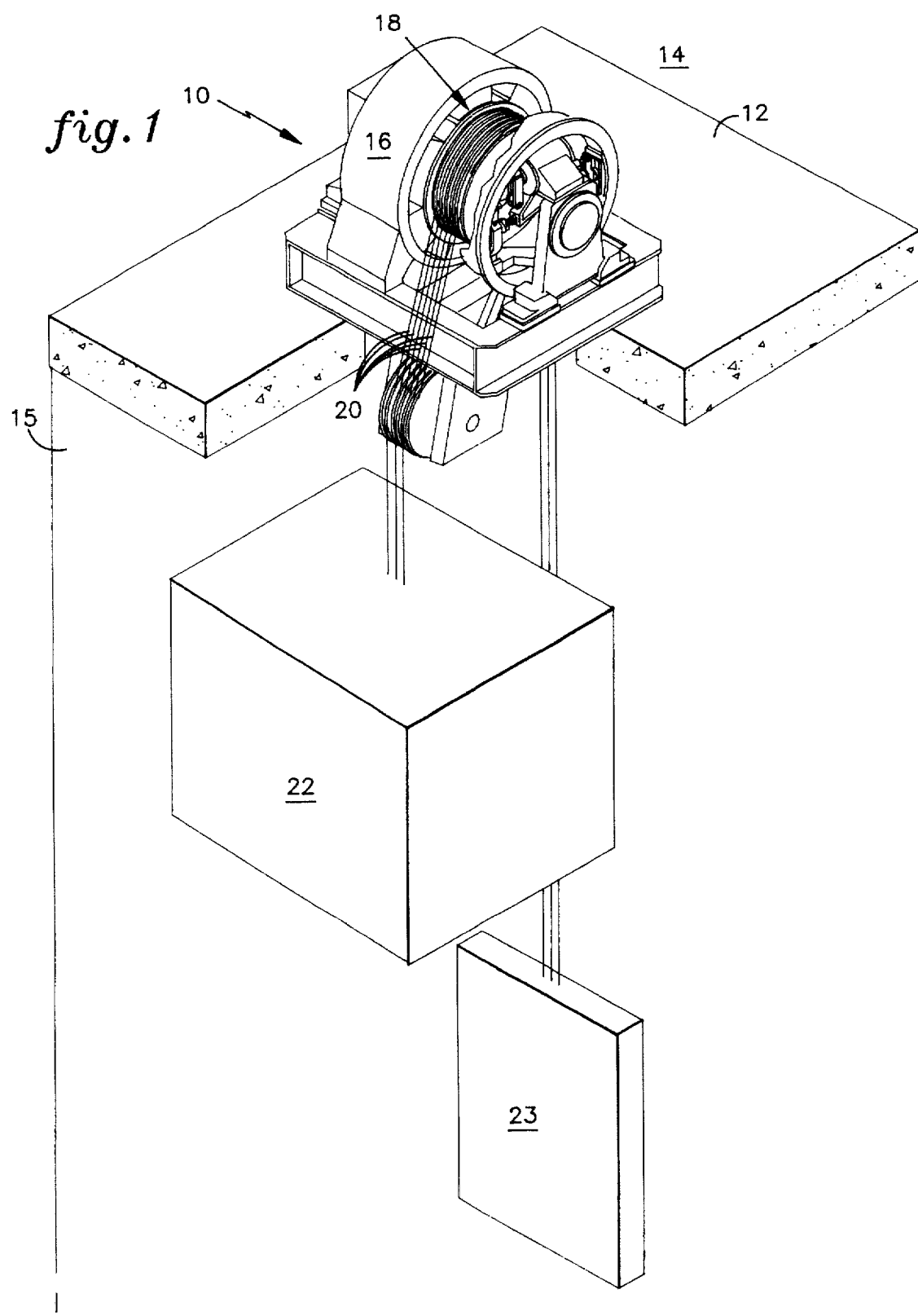
FIG. 1 is a schematic, partially broken-away perspective view of a drive motor and a drive sheave assembly supporting a plurality of hoist ropes in an elevator machine room.

FIG. 1 depicts a hoist machine 10 used for driving an elevator. The hoist machine 10 rests on a floor 12 of a machine room 14 which is typically located at the top of an elevator hoistway 15. The hoist machine 10 includes a drive motor 16 that transmits a driving force to a drive sheave 18. The drive sheave 18 supports a plurality of hoist ropes 20 that have an elevator car 22 suspended on one end and a counterweight 23 suspended on the other end thereof.

Referring to FIG. 2, the drive sheave 18 includes a plurality of sheave grooves 24 with each groove 24 accommodating a sheave liner 26 that in turn supports the hoist rope 20. The sheave liners 26 are molded from a polyurethane material and include an outside surface 28 and an inside surface 30. The outside surface 28 conforms to the shape of the sheave groove 24 and includes a bottom 32 that rests within the sheave groove 24. The inside surface 30 is shaped to accommodate the hoist rope 20 and includes a plurality of notches 34 equally spaced from each other.

Referring to FIG. 3, the sheave liner 26 also includes a first end 36 and a second end 38 having a first end surface 42 and a second end surface 44, respectively. A plurality of bicycle chain 50 links are molded into each liner end 36, 38, as shown in FIG. 4. Although the length of the chain 50 is not critical, it is optimum to include approximately three (3) inches of the chain into each liner end 36, 38 to insure strong bonding. A male link 52 of the bicycle chain 50 protrudes from the first end surface 42 of the sheave liner 26. The male link 52 of the bicycle chain 50 includes a male link opening 54 that is substantially parallel to the first end surface 42. A female link 56 protrudes from the second end surface 44 and includes a female link opening 58 that mates with the male link opening 54.

A pin 70, shown in FIG. 3, includes a tip portion 71 that terminates in a pointed tip 72 and a head portion 73 that terminates with a pin head 74. The tip portion 71 and the head portion 73 are separated by a pin notch 75. The length of the head portion of the pin 70 approximately equals to the width of the liner 26.

During the replacement procedure of the sheave liners, each existing sheave liner is cut in the lower portion of the sheave 18 where the liner is not supporting the rope 20 and is therefore exposed. Once the liner is cut, the existing liner is rotated out by running the drive motor 16 at very low speeds and holding onto the existing liner end that is being rotated outward. One end of the new liner 26 is positioned between the hoist rope 20 and the sheave groove 24 so that as the drive sheave 18 is rotating slowly, the sheave liner 26 is pulled in between the rope 20 and the groove 24. Once the new liner end is sufficiently gripped between the rope 20 and the groove 24, the free end of the new liner 26 is placed in tension by hand or tools. Since the liner 26 is fabricated from a polyurethane type of material, the liner can be slightly stretched when placed in tension. The drive motor 16 is stopped as soon as the first liner end becomes visible within the lower portion of the sheave where no contact with the hoist rope 20 occurs. When the two liner ends 36, 38 are exposed within the lower portion of the sheave 18, the male link 52 of the bicycle chain 50 is fitted within the female link 56 so that the male opening 54 is in register with the female opening 58. The pin 70 is placed through the two openings 54, 58 with the pointed tip 72 entering the openings 54, 58 first. The pin 70 is then pulled through the openings 54, 58 so that the pin head 74 rests against the bicycle chain link. The tip portion 71 of the pin 70 is then snapped off at the pin notch 75. The pin notch 75 facilitates easy removal of the tip portion 71 of the pin. The liner 26 is then released and allowed to fit completely into the groove. After a few relatively slow rotations of the motor, the tension within the liner is removed.

Alternatively, it is possible to allow the new liner to rotate into its place without placing the liner in tension while the liner is being rotated into its position. However, after the liner 26 is positioned within the groove 24, the two ends 36, 38 will have to be pulled together. The liner length is substantially equal to the circumference of the sheave groove 24. Typically, liners are fabricated from a polyurethane material that is flexible and allows some stretching so that the two ends 36, 38 can be properly joined. After the two liner ends 36, 38 are joined and the tension is removed, the liner 26 will resume its initial length.

A number of tools can be used to aid the process of joining the two ends 36, 38 of the liner 26 and maintaining the two ends aligned while the pin 70 is inserted. One such example of a tool is shown in FIG. 4. The tool 80 includes a crank 82 with a midpoint 84 that separates two opposite-threaded crank sides 86, 88. A block 90 with notch teeth 92 is threadably mounted onto each crank side 86, 88. Each block 90 includes internal threads that allow the block to move along the threaded crank sides 86, 88. Each notch tooth 92 conforms in shape and fits into the notches 34 of the sheave liner 26. The notch teeth 92 of each block 90 are spaced apart so that each notch tooth 92 fits into the corresponding notch 34 of the liner 26. Once the notch teeth 92 are placed into the notches 34 of the liner 26, each block 90 is secured to the liner 26 by means of a bracket 94, as shown in FIG. 5. The bracket 94 insures that the liner does not slip out from the tool 80. Once the crank handle 82 is turned, the opposite threaded sides 86, 88 pull the liner ends 36, 38 together. The liner ends 36, 38 can also include an angled surface 98 to accommodate protruding links 52, 56 so that a gap between the liner ends 36, 38 is minimized. The mechanical joint should have a commercially available RTV (room temperature vulcanize) applied to reduce negative effects of exposure to the environment and relative motion.

Another means for attaching two liner ends 36, 38 is a room temperature urethane structural adhesive. A two part adhesive includes a resin part and a curative part. The resin part comprises a mixture of diisocyanates that includes 4,4'-diphenylmethane diisocyanate, diphenylmethane diisocyanate, and aromatic polyisocyanate. The curative part comprises either a polymeric diol curative or a polymeric diamine curative.

One commercially available product that falls within such category is Tyrite®, manufactured by Lord Corporation of Erie, Pa. The resin part of Tyrite® is Tyrite® 7520 (A) and comprises a mixture of diisocyanates that includes 4,4'-diphenylmethane diisocyanate, diphenylmethane diisocyanate, and aromatic polyisocyanate. The curative part of Tyrite® is Tyrite® 7520 (B) and comprises a diol, an aliphatic polyesterdiol.

The resin and the curative parts are mixed in equal parts prior to application onto the liner ends 36, 38. The mixture is allowed to thicken for approximately ten (10) minutes. A procedure for getting a new liner in a position for bonding is identical to the one described above. Once the new liner is positioned between the rope 20 and the sheave groove 24, each liner end 36, 38 would have to be cleaned with a cleaning solution to remove any contaminates. Although a number of cleaning solutions can be used, one effective solution is Simple Green®, manufactured by Sunshine Makers Inc. of Sunset Beach, Calif. Alternatively, the liner ends 36, 38 can be recut to provide a new, clean end surface. The urethane structural adhesive mixture is then applied onto each end 36, 38 of the liner 26. The two liner ends 36, 38 are then brought together in close proximity to each other by means of a tool 80 described above and shown in FIGS. 4 and 5. The two ends 36, 38 then remain in such position for approximately two to three (2-3) hours until the room temperature adhesive cures. After the bond in formed, the tool is removed and the sheave liner 26 is allowed to resume its shape.

The replacement of sheave liners procedure of the present invention can be accomplished much faster than the methods previously employed. The method of the present invention does not require removal of the elevator car from the drive sheave and then the proper placement of the elevator car onto the drive sheave after the procedure. Rather, the present invention allows for the replacement of the sheave liners while the elevator car is still "hung" from the hoist ropes supported by the drive sheave. Since removal of the elevator car and subsequent readjustment of the hoist ropes is time consuming and labor intensive, the present invention significantly reduces the time that the elevator car is out of service. Additionally, the time savings result from the actual joining process both, the mechanical bond and the urethane structural adhesive bond require much less time than previous procedure involving heaters.

Another major attribute of the present invention is that this replacement procedure can be completed by a regular maintenance crew rather than a specialized repair crew. This results in cost savings to the customers who already have a maintenance crew on site.

Although the invention has been shown and described with respect to exemplary embodiments thereof, it should be understood by those skilled in the art that various changes omissions, and additions may be made thereto without departing from the spirit and scope of the invention. For example, a number of different mechanical bonds are feasible to join the first liner end and the second liner end and are within the scope of the present invention.

We claim:

1. A method of replacing an existing sheave liner for a drive sheave with a new liner, said drive sheave having a sheave groove for accommodating said existing liner, said existing liner supporting a rope with said rope having contact with a substantial portion of said existing sheave liner and hanging downward from said sheave thereby having an exposed portion of said existing sheave liner, said sheave groove having a circumference, said method comprising the steps of:

providing a new liner for said drive sheave, said new liner having a first new liner end and a second new liner end, said new liner having length substantially equal to the length of said circumference of said sheave groove;

cutting said existing sheave liner so that a first existing liner end and a second existing liner end are formed;

pulling said first existing liner end outwardly to remove said existing liner;

positioning said first new liner end between said rope and said groove so that said first end of said new liner being pulled inward in direction of rotation of said sheave; and joining said first new liner end and said second new liner end to form a substantially continuous new liner.

2. The method according to claim 1 further comprising the step of providing tension to said second end of said new liner after said first new liner end being sufficiently pulled inward between said rope and said sheave groove.

3. The method according to claim 1 further comprising the step of providing a first clean end surface at said first new liner end and a second clean end surface at said second new liner end prior to the joining step of said first new liner end and said second new liner end.

4. The method according to claim 3 wherein the step of joining said first new liner end with said second new liner end includes the steps of:

applying a room temperature urethane adhesive to said first clean end surface of said first new liner end and to said second clean end surface of said second new liner end; and maintaining said first new liner end and said second new liner end in close proximity during a curing process.

5. The method according to claim 4 wherein said room temperature adhesive having a resin part and a curative part.

6. The method according to claim 5 wherein said resin part of said room temperature adhesive comprises a mixture of diisocyanates including 4,4'-diphenylmethane diisocyanate, diphenylmethane diisocyanate, and aromatic polyisocyanate.

7. The method according to claim 5 wherein said curative part of said room temperature adhesive comprises a polymeric diol.

8. The method according to claim 5 wherein said curative part of said room temperature adhesive comprises a polymeric diamine.

9. The method according to claim 4 further comprising a subsequent step of curing said room temperature adhesive for approximately two to three (2-3) hours.

10. The method for replacing an existing sheave liner for a drive sheave with a new liner according to claim 1 further comprising the steps of:

placing a male opening formed within a protruding male link of a first bicycle chain molded within said first new liner end in register with a female opening formed within a protruding female link of a second bicycle chain molded within said second new liner end; and inserting a pin through said male opening and said female opening so that said first new liner end being joined with said second new liner end.

11. The method according to claim 10 further comprising a subsequent step of encapsulating a gap between said first new liner end and said second new liner end with a room temperature vulcanize.

12. The method according to claim 10 wherein:

said first new liner end further comprises a first angled surface from which said first bicycle chain is protruding; and said second new liner end further comprises a second angled surface from which said second bicycle chain is protruding.

13. The method according to claim 1 further characterized by said sheave liner being fabricated from polyurethane.

* * * * *